US009784303B2

(12) United States Patent
Jang (10) Patent No.: US 9,784,303 B2
(45) Date of Patent: Oct. 10, 2017

(54) STRUCTURE FOR FIXING SHIFT CABLE (71) Applicant: INFAC CORPORATION, Gyeonggi-do (KR)

(72) Inventor: Hongsuk Jang, Chungcheongnam-do (KR)

(73) Assignee: INFAC CORPORATION, Ansan-si (KR)

( * ) Notice: Subject to any disclaimer, the term of this patent is extended or adjusted under 35 U.S.C. 154(b) by 0 days.

(21) Appl. No.: 14/361,303

(22) PCT Filed: Mar. 11, 2014

(86) PCT No.: PCT/KR2014/002009
§ 371 (c)(1),
(2) Date: May 29, 2014

(87) PCT Pub. No.: WO2015/137529
PCT Pub. Date: Sep. 17, 2015

(65) Prior Publication Data
US 2016/0369834 A1    Dec. 22, 2016

(51) Int. Cl.
*F16C 1/10*      (2006.01)
*F16C 1/26*      (2006.01)
(Continued)

(52) U.S. Cl.
CPC .............. *F16C 1/105* (2013.01); *B60K 20/00* (2013.01); *B60K 20/02* (2013.01); *F16C 1/101* (2013.01); *F16C 1/108* (2013.01); *F16G 11/00* (2013.01)

(58) Field of Classification Search
CPC .. F16C 1/105; F16C 1/101; F16C 1/08; F16C 1/26; F16C 1/262; F16C 1/265; F16C 1/102; F16C 1/103; F16C 1/10; F16C 1/14; F16C 1/16; F16C 1/145; F16C 1/108; B60K 20/00; B60K 20/02; F16G 11/00
See application file for complete search history.

(56) References Cited

U.S. PATENT DOCUMENTS 5,884,531 A * 3/1999 Koenig .................... F16C 1/108
74/500.5
7,597,027 B2 * 10/2009 Kwon ..................... F16C 1/105
248/56

(Continued)

FOREIGN PATENT DOCUMENTS

CN        203418988 U    2/2014
KR    10-2005-0096588 A   10/2005
(Continued)

Primary Examiner — Adam D Rogers
(74) Attorney, Agent, or Firm — Gokalp Bayramoglu (57) ABSTRACT A structure for fixing a shift cable comprises a protective tube for receiving the shift cable therein, a connection tube installed outside the protective tube, a damper installed outside the connection tube to attenuate radial and axial vibration, a main casing which is installed outside the damper and forms a clearance for assembly with a mounting bracket, a sub-casing which is detachably coupled to the main casing by means of an axial assembly guide portion, and a cover which is supported by means of an elastic member with respect to the sub-casing and is installed such that an axial displacement of the cover is restricted with respect to the main casing.

7 Claims, 9 Drawing Sheets

(51) Int. Cl.
*B60K 20/02* (2006.01)
*F16G 11/00* (2006.01)
*B60K 20/00* (2006.01)

(56) References Cited

U.S. PATENT DOCUMENTS

| | | | | |
|---|---|---|---|---|
| 8,312,788 B2* | 11/2012 | Kwon | ............... | F16C 1/105 |
| | | | | 74/502.4 |
| 8,418,580 B2* | 4/2013 | Ruhlander | ............... | F16C 1/105 |
| | | | | 403/195 |
| 8,671,798 B2* | 3/2014 | Kwon | ............... | F16C 1/105 |
| | | | | 74/502.4 |
| 8,727,287 B2* | 5/2014 | Trouve | ............... | F16C 1/105 |
| | | | | 248/49 |
| 9,004,442 B2* | 4/2015 | Norris | ............... | F16C 1/105 |
| | | | | 248/636 |
| 2012/0066870 A1* | 3/2012 | Quaglia | ............... | F16C 1/105 |
| | | | | 24/122.3 |
| 2015/0007683 A1* | 1/2015 | Aoki | ............... | F16C 1/145 |
| | | | | 74/502.4 |

FOREIGN PATENT DOCUMENTS

| | | |
|---|---|---|
| KR | 10-2011-0089566 A | 8/2011 |
| KR | 10-2013-0001784 A | 1/2013 |
| KR | 10-1355618 B1 | 1/2014 |
| WO | WO2012/169495 A1 | 12/2012 |

* cited by examiner

STRUCTURE FOR FIXING SHIFT CABLE

The present invention relates to a fixing structure for installing a shift cable, and more particularly, to a structure for fixing a shift cable, capable of setting a structure for fixing a shift cable to a vehicle body as an attachable and detachable structure of one-touch type to more easily realize an installation process of the shift cable in a small space and of ensuring more improved attenuation performance by means of securing a clearance for increasing an amount of deformation of a damper in an inner space of the structure.

BACKGROUND ART

In general, the speed of a vehicle is changed by operation of a shift lever by a driver. To this end, a shift cable is installed between a transmission and the shift lever in order to transmit operation force. For example, a series of gear shifting processes performed in the vehicle mounting a manual transmission is realized by sequentially transmitting operation force applied to the shift lever installed to a driver's seat to many gears located in the transmission through the shift cable.

Since such a shift cable, which is connected between the transmission and the shift lever to transmit the operation force by the driver, is installed in a small space inside an engine room, the shift cable has a structure of being fixed at a specific position in order to prevent interference with many components around the same.

The conventional typical shift cable is installed using a mounting bracket fixed to a vehicle body. In this case, since vibration from an engine to the transmission is transferred to the vehicle body and the shift lever through the shift cable, there is a problem in that undesired vibration and noise are caused.

Accordingly, various fixing structures are proposed in order to reduce vibration and noise transferred to the vehicle body and the shift lever through the shift cable. However, the above fixing structures have problems in that it is difficult to satisfactorily reduce vibration and noise and a process of fixing the structure for installation of the shift cable is not particularly easy in the small space inside the engine room.

In addition, according to a result of testing characteristics of load versus displacement with respect to the fixing structure for installation of the conventional shift cable, since hysteresis characteristics may not be obtained to the desired extent, there is required an improvement in the fixing structure.

DISCLOSURE

Technical Problem

Accordingly, the present invention has been made in view of the above-mentioned problem, and an object thereof is to provide a structure for fixing a shift cable, capable of setting a structure for fixing a shift cable to a vehicle body as an attachable and detachable structure of one-touch type to more easily realize an installation process of the shift cable in a small space and of maximizing reductions of vibration and noise by ensuring more improved attenuation performance by means of securing a clearance for increasing an amount of deformation of a damper in an inner space of the structure.

Technical Solution

In accordance with an aspect of the present invention, a structure for installing a shift cable of a manual transmission includes a protective tube for receiving the shift cable therein, a connection tube installed outside the protective tube, a damper installed outside the connection tube to attenuate radial and axial vibration, a main casing which is installed outside the damper and forms a clearance for assembly with a mounting bracket, a sub-casing which is detachably coupled to the main casing by means of an axial assembly guide portion, and a cover which is supported by means of an elastic member with respect to the sub-casing and is installed such that an axial displacement of the cover is restricted with respect to the main casing.

The protective tube may include a fixed tube and a moving tube which are installed outside the shift cable while being coaxially arranged with the shift cable.

The fixed tube may be formed, at an outer peripheral surface thereof, with a catching protrusion for coupling with an inner peripheral surface of the connection tube, and the moving tube may be formed, at an outer peripheral surface thereof, with a spherical connection portion capable of rotating relative to the inner peripheral surface of the connection tube.

The connection tube may include a first tubular member which is formed, at an inner peripheral surface thereof, with a catching groove for coupling with the catching protrusion of the fixed tube, a second tubular member which is formed, at an inner peripheral surface thereof, with a spherical seating portion for coupling with the spherical connection portion of the moving tube, and a division flange which protrudes outward between the first and second tubular members.

The damper may include circumferential protrusions which protrude toward an inner peripheral surface of the main casing in a space between the connection tube, the main casing, and the sub-casing, an axial protrusion which protrudes toward the inner peripheral surface of the main casing or an inner peripheral surface of the sub-casing, and an insertion groove which is axially formed for coupling with the connection tube.

The circumferential protrusions may be formed on a first diameter portion and a second diameter portion of the damper, respectively, and a diameter of the first diameter portion is larger than a diameter of the second diameter portion.

The main casing may include a support projection which protrudes outward for restricting the axial displacement of the cover, a fixing protrusion having an inclined cross-sectional structure for coupling with the sub-casing, a guide protrusion which axially protrudes to guide coupling with the sub-casing, a mounting flange which protrudes outward for coupling with the mounting bracket, and a catching projection which is formed in a stepped shape outside the mounting flange.

The sub-casing may include an insertion hole which is formed to insert the fixing protrusion of the main casing thereinto, a guide slot which is axially formed to insert the guide protrusion of the main casing thereinto, and a support end which is formed so as to protrude outward from an inlet of the guide slot and come into contact with the elastic member.

The cover may include a guide groove which is formed on an inner peripheral surface thereof to receive the support projection of the main casing and restrict the axial displacement of the cover, a pressing end which is formed so as to come into contact with the mounting bracket by means of a pressing force by the elastic member, and a receiving space which is formed on the inner peripheral surface of the cover to install the elastic member.

The structure may further include a boot seal which is installed between the moving tube and the main casing so as to block introduction of foreign matters thereinto and an end seal which is installed to a free end of the moving tube so as to block introduction of foreign matters thereinto.

Additional advantages, objects, and features of the invention will be set forth in part in the description which follows and in part will become apparent to those having ordinary skill in the art upon examination of the following or may be learned from practice of the invention.

BRIEF DESCRIPTION OF DRAWINGS

The above and other objects, features and other advantages of the present invention will be more clearly understood from the following detailed description taken in conjunction with the accompanying drawings, in which.

BEST MODE FOR INVENTION

Reference will now be made in detail to embodiments of the present invention, examples of which are illustrated in the accompanying drawings.

Figure 1:
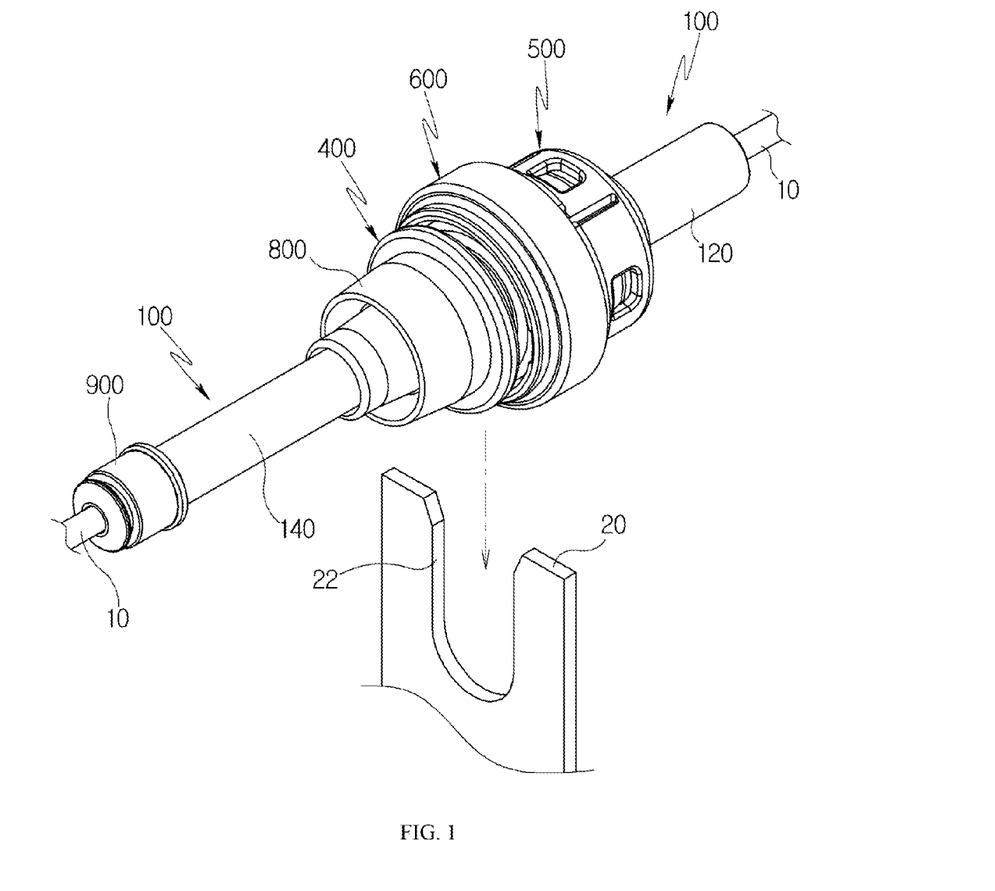
FIG. 1 is a perspective view illustrating a configuration of a structure for fixing a shift cable according to an embodiment of the present invention, together with a part of a vehicle body to which the structure is assembled.

Referring to FIG. 1, a shift cable 10 of a manual transmission is fixed to a mounting bracket 20 installed to a vehicle body by means of a fixing structure. In particular, the shift cable 10 is inserted into a mounting groove 22 which is formed at the bracket 20 to be opened upward so as to be supported by the mounting groove 22. To this end, the fixing structure includes a protective tube 100, a connection tube 200, dampers 300, a main casing 400, a sub-casing 500, and a cover 600, as shown in FIGS. 2 to 5.

Referring to FIGS. 2 to 5, the protective tube 100 is a tubular member defining a space for receiving the shift cable 10 therein, and is formed of a plurality of tubular members which are coaxially arranged with the shift cable 10 in a state of being spaced apart from each other outside the shift cable 10. That is, the protective tube 100 includes a hollow fixed tube 120 which receives the shift cable 10 therein and a hollow moving tube 140 which receives the shift cable 10 therein and is arranged at a position spaced apart from a free end of one side of the fixed tube 120.

The free end of one side of the fixed tube 120 is integrally formed, at an outer peripheral surface thereof, with a multistage catching protrusion 122 for close coupling with an inner peripheral surface of the connection tube 200. A free end of one side of the moving tube 140 is integrally formed, at an outer peripheral surface thereof, with a spherical connection portion 142 to be freely whirled relative to the inner peripheral surface of the connection tube 200.

Referring to FIGS. 2 to 5, the connection tube 200 serves to assemble and couple the free ends of the protective tube 100 formed of the plural tubular members to each other. The connection tube 200 includes a first tubular member 220, a second tubular member 240, and a division flange 260 which are integrally formed with each other. That is, the connection tube 200 includes a first hollow tubular member 220 for assembly with the fixed tube 120, a second hollow tubular member 240 for assembly with the moving tube 140, and a division flange 260 which protrudes outward between the first and second tubular members 220 and 240. In this case, the insides of the first and second tubular members 220 and 240 and the division flange 260 may all communicate with each other for insertion of the shift cable 10 thereinto.

The first tubular member 220 is integrally formed, at an inner peripheral surface thereof, with a multistage catching groove 222 formed of a shape corresponding to the multistage catching protrusion 122 located at the free end of the fixed tube 120 such that the multistage catching protrusion 122 is closely coupled to the multistage catching groove 222.

The second tubular member 240 is integrally formed, at an inlet on an inner peripheral surface thereof, with a spherical seating portion 242 for supporting the spherical connection portion 142 located at the free end of the moving tube 140 such that the spherical connection portion 142 is able to be whirled. In this case, the spherical connection portion 142 of the moving tube 140 is coupled to the spherical seating portion 242 formed at the inlet on the inner peripheral surface of the second tubular member 240 by a forcible press-fitting method, thereby allowing the moving tube 140 to be partially moved relative to the connection tube 200 so that the moving tube 140 is partially rotated in an axial direction thereof while being partially whirled in an inclined direction relative to the axial direction.

The division flange 260 is a partition wall member which axially divides between a damper 300 installed on the outer peripheral surface of the first tubular member 220 and another damper 300 installed on the outer peripheral surface of the second tubular member 240 to support the same. To this end, the division flange 260 is integrally formed with fitting projections 262 having an outwardly protruding shape such that the fitting projections 262 are individually fixed to a pair of dampers 300. In this case, the fitting projections 262 are concentrically arranged on both surfaces of the division flange 260 along respective outer circumferences of the first and second tubular members 220 and 240.

Referring to FIGS. 2 to 5, 7, and 8, the dampers 300 are assembled outside the connection tube and serve to absorb and buffer vibration transferred in radial and axial directions of the structure in a space between the main casing 400 and the sub-casing 500. In this case, the dampers 300 are a pair of members individually installed outside the first and second tubular members 220 and 240 on the basis of the division flange 260.

In particular, each of the dampers 300 includes at least one or more circumferential protrusions 320 which are wholly formed around a large diameter portion of the damper at positions spaced apart from each other in a space formed between the outer peripheral surface of the connection tube 200 and inner peripheral surfaces of the main casing 400 and the sub-casing 500, at least one or more circumferential protrusions 340 which are wholly formed around a small diameter portion of the damper at positions spaced apart from each other, an axial protrusion 360 which axially outwardly protrudes toward the inner peripheral surface of the main casing 400 or the inner peripheral surface of the sub-casing 500 from a free end of the large diameter portion so as to come into contact with the inner peripheral surface of the main casing 400 or the sub-casing 500, and an insertion groove 380 which is concavely formed for assembly with the associated fitting projection 262 formed on the division flange 260 of the connection tube 200.

That is, the damper 300 has a cross-sectional structure of integrally having the large diameter portion which is formed, at the outer peripheral surface thereof, with the circumferential protrusions 320 and the small diameter portion which is formed, at the outer peripheral surface thereof, with the circumferential protrusions 340 and axially extends from the large diameter portion. In this case, the axial protrusion 360 axially extends toward the small diameter portion from a free end of one side of the large diameter portion, and the insertion groove 380 is separately formed on a portion opposite to the formed portion of the axial protrusion 360 while being concentrically formed with respect to the large diameter portion.

Referring to FIGS. 2 to 7, the main casing 400 is a hollow member fitted outside the protective tube 100 so as to install the damper 300 inside the main casing 400. The main casing 400 includes a support projection 410 which protrudes outward for restricting an axial displacement of the cover 600, a fixing protrusion 420 having an inclined cross-sectional structure for coupling with the sub-casing 500, a guide protrusion 430 which axially extends and protrudes for guiding an assembly direction during coupling with the sub-casing 500, a mounting flange 440 which protrudes outward and provides a clearance for coupling with the mounting groove 22 formed at the mounting bracket 20 of the vehicle body, and a catching projection 450 which is concavely formed and has a stepped shape for installing a boot seal 800 outside the mounting flange 440. In particular, the inner peripheral surface of the main casing 400 has a stepped shape having different diameters in a multistage manner for contact with the protrusions 320 and the axial protrusion 360 formed on the large diameter portion of the damper 300 and for contact with the protrusions 340 formed on the large diameter portion.

In addition, the support projection 410 is formed in plural numbers and the support projections 410 are wholly arranged around the outer peripheral surface of the main casing 400 so as to be located at positions radially spaced from a center thereof. Similarly to the support projections 410, each of the fixing protrusion 420 and the guide protrusion 430 is formed in plural numbers and these are wholly arranged around the outer peripheral surface. In this case, the fixing protrusion 420 has a wedge shape structure in which an area of the inclined cross-sectional portion is gradually decreased toward the assembly direction with the sub-casing 500. In addition, the guide protrusion 430 is formed on the outer peripheral surface of the main casing 400 to extend and protrude along the axial direction thereof and serves to guide the assembly direction in place during coupling with the sub-casing 500.

Referring to FIGS. 2 to 7, the sub-casing 500 is a hollow member configured to receive the damper 300 therein by axially detachable coupling with the main casing 400. In particular, the sub-casing 500 may be easily axially assembled to or disassembled from the main casing 400 by means of an axial assembly guide portion.

The sub-casing 500 includes an insertion hole 520 formed to insert the fixing protrusion 420 of the main casing 400 thereinto, a guide slot 540 formed in the form of being lengthily cut in the axial direction so as to insert the guide protrusion 430 of the main casing 400 thereinto, and a support end 560 which protrudes outward to come into contact with one side of a wave spring 700 at an inlet of the guide slot 540. In particular, the inner peripheral surface of the sub-casing 500 has a stepped shape having different diameters in a multistage manner for contact with the axial protrusion 360 formed on the large diameter portion of the damper 300 and for contact with the protrusions 340 formed on the large diameter portion.

In addition, each of the insertion hole 520 and the guide slot 540 is formed in plural numbers and the insertion holes 520 and the guide slots 540 are wholly arranged around the outer peripheral surface of the sub-casing 500 so as to be located at positions radially spaced from a center thereof. In this case, the insertion hole 520 and the guide slot 540 of the sub-casing 500 may be formed at respective positions corresponding to the fixing protrusion 420 and the guide protrusion 430 of the main casing 400. That is, the guide slot 540 formed on the sub-casing 500 serves to guide the axial insertion of the guide protrusion 430 when the sub-casing 500 is assembled to the main casing 400, thereby accurately performing assembly therebetween. In addition, the insertion hole 520 formed on the sub-casing 500 serves to restrict abnormal separation by supporting the fixing protrusion 420 when the sub-casing 500 is assembled to the main casing 400.

Referring to FIGS. 2 to 5, the cover 600 is elastically supported by an elastic member with respect to the sub-casing 500 and is installed such that an axial displacement of the cover is restricted in the outside of the main casing 400, thereby providing fastening force for fixing the overall fixing structure to the mounting bracket 20. That is, the cover 600 is a hollow member and is axially movably installed outside the main casing 400 by means of support force by the elastic member.

The cover 600 includes a guide groove 620 which is formed on an inner peripheral surface of one end portion thereof to receive the support projections 410 of the main casing 400 therein and restrict the axial displacement of the cover 600 relative to the main casing 400, a pressing end 640 which is formed at one end portion of the cover to come into direct contact with the mounting bracket 20 by means of a pressing force by the elastic member, and a receiving space 660 which is concavely formed on an inner peripheral surface of the other end portion of the cover facing the pressing end 640 so as to install the elastic member.

In this case, the guide groove 620 serves as an axial displacement restricting portion which restricts a distance when the cover 600 is axially moved relative to the outer peripheral surface of the main casing 400 by elastic force provided from the elastic member, thereby preventing the cover 600 from being fully separated from the main casing 400.

Referring to FIGS. 2 to 7, the wave spring 700 is installed at a facing portion between the sub-casing 500 and the cover 600 to provide force by which the cover 600 moves toward the mounting bracket 20 against the sub-casing 500. Thus, the mounting groove 22 of the mounting bracket 20 may be inserted into a clearance formed between the mounting flange 440 and the pressing end 640 of the cover 600. In this case, since the elastic member presses the cover 600 toward the mounting bracket 20, the fixing structure may be securely installed to the mounting bracket 20.

Figure 2:
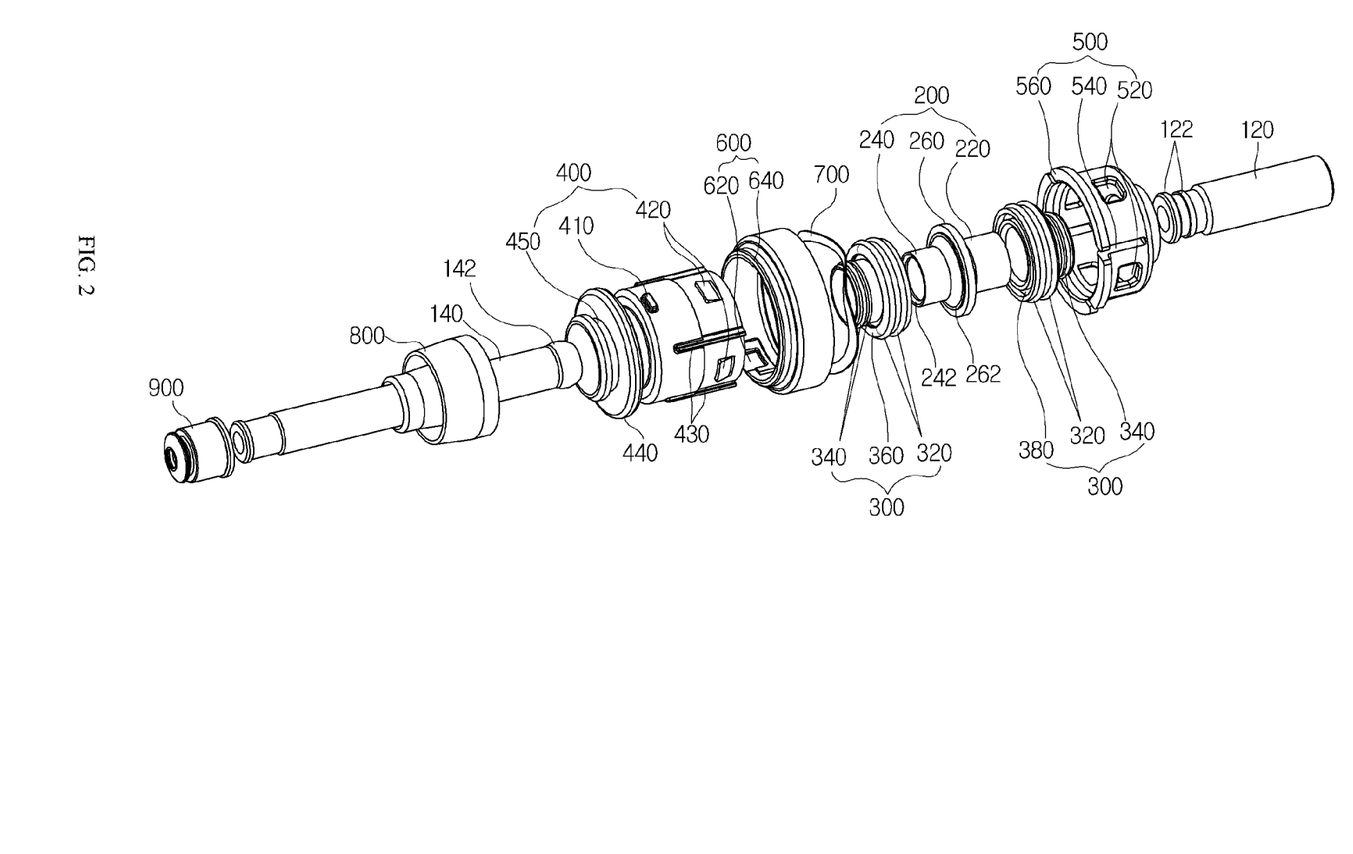
FIG. 2 is an exploded perspective view illustrating the configuration of the structure for fixing a shift cable shown in FIG. 1.
Figure 3:
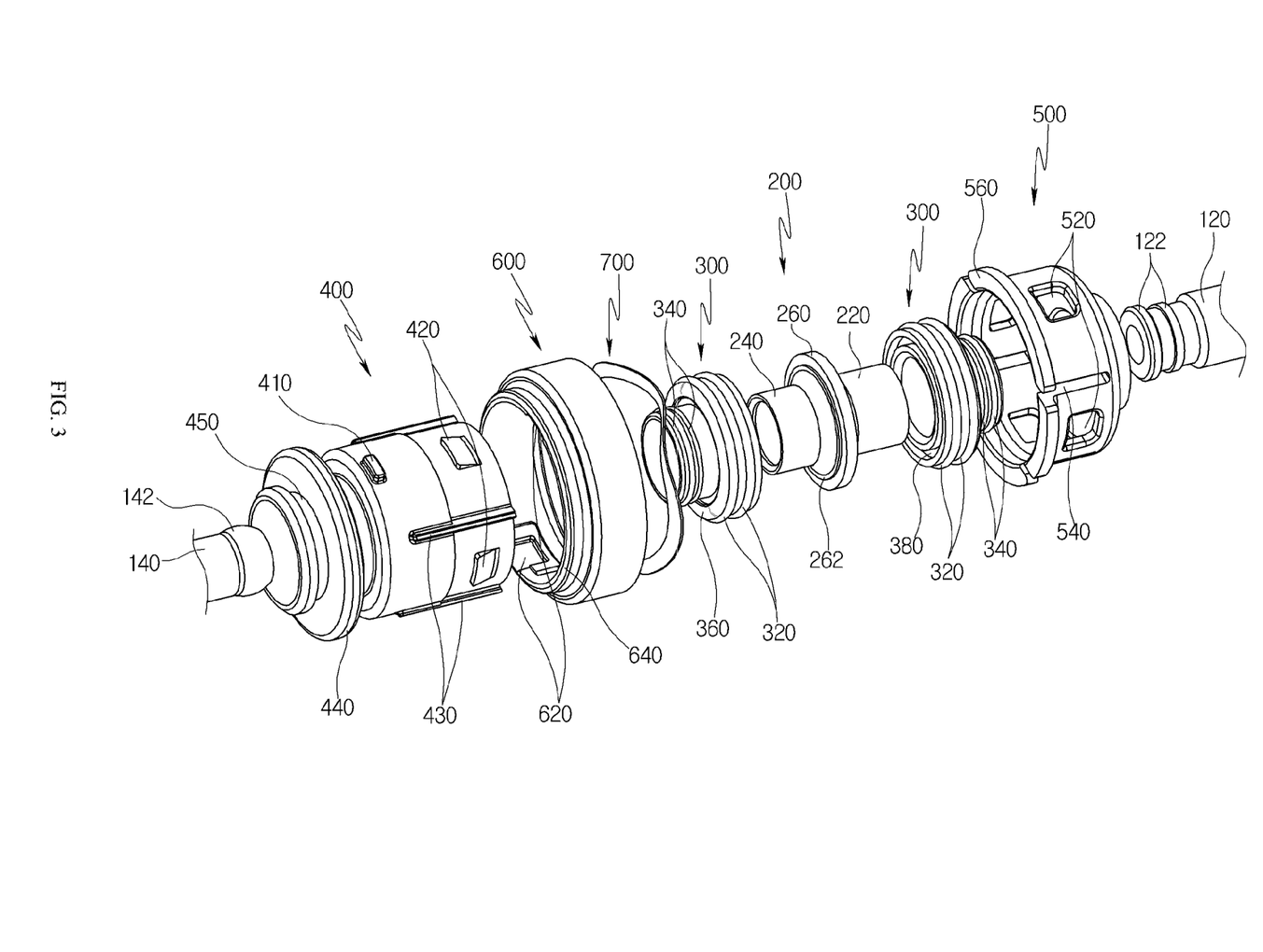
FIG. 3 is a partially enlarged perspective view illustrating principal parts of the structure for fixing a shift cable shown in FIG. 2.
Figure 4:
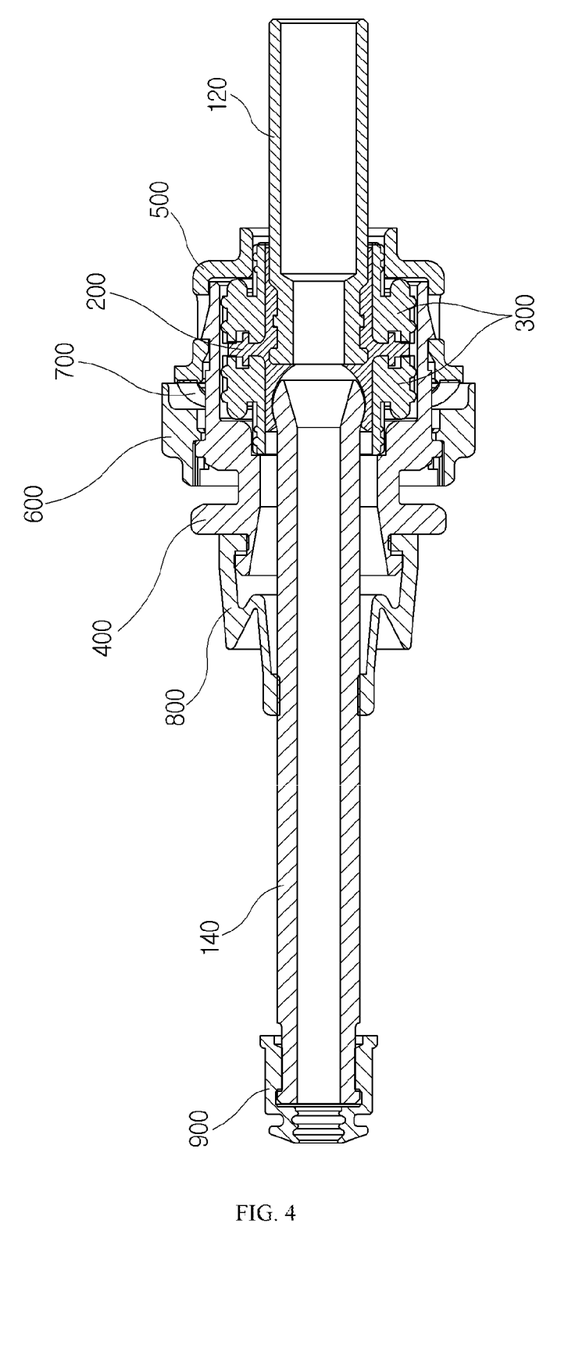
FIG. 4 is a cross-sectional view illustrating the configuration of the structure for fixing a shift cable shown in FIG. 1.
Figure 5:
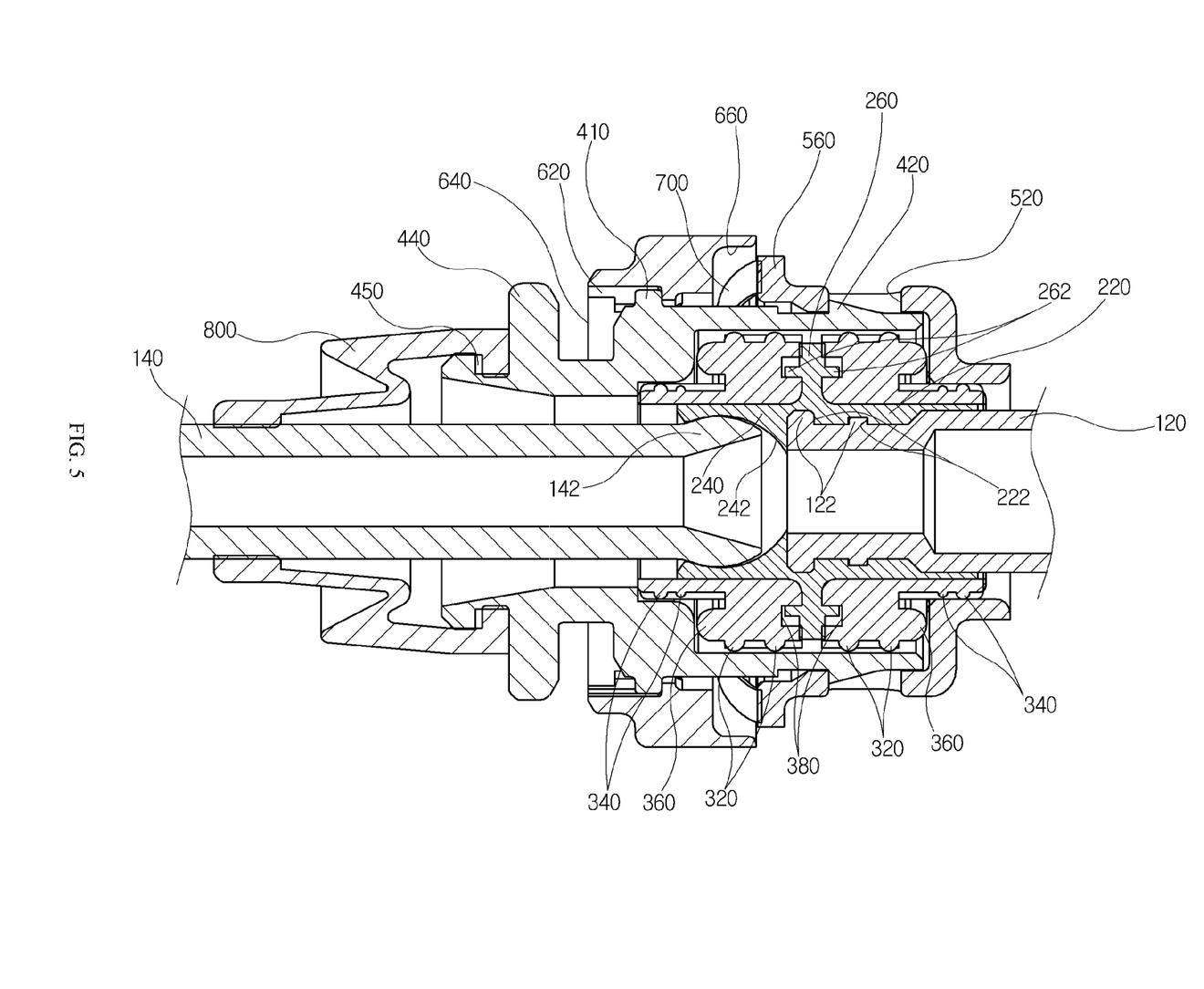
FIG. 5 is a partially enlarged cross-sectional view illustrating the principal parts of the structure for fixing a shift cable shown in FIG. 4.
Figure 6:
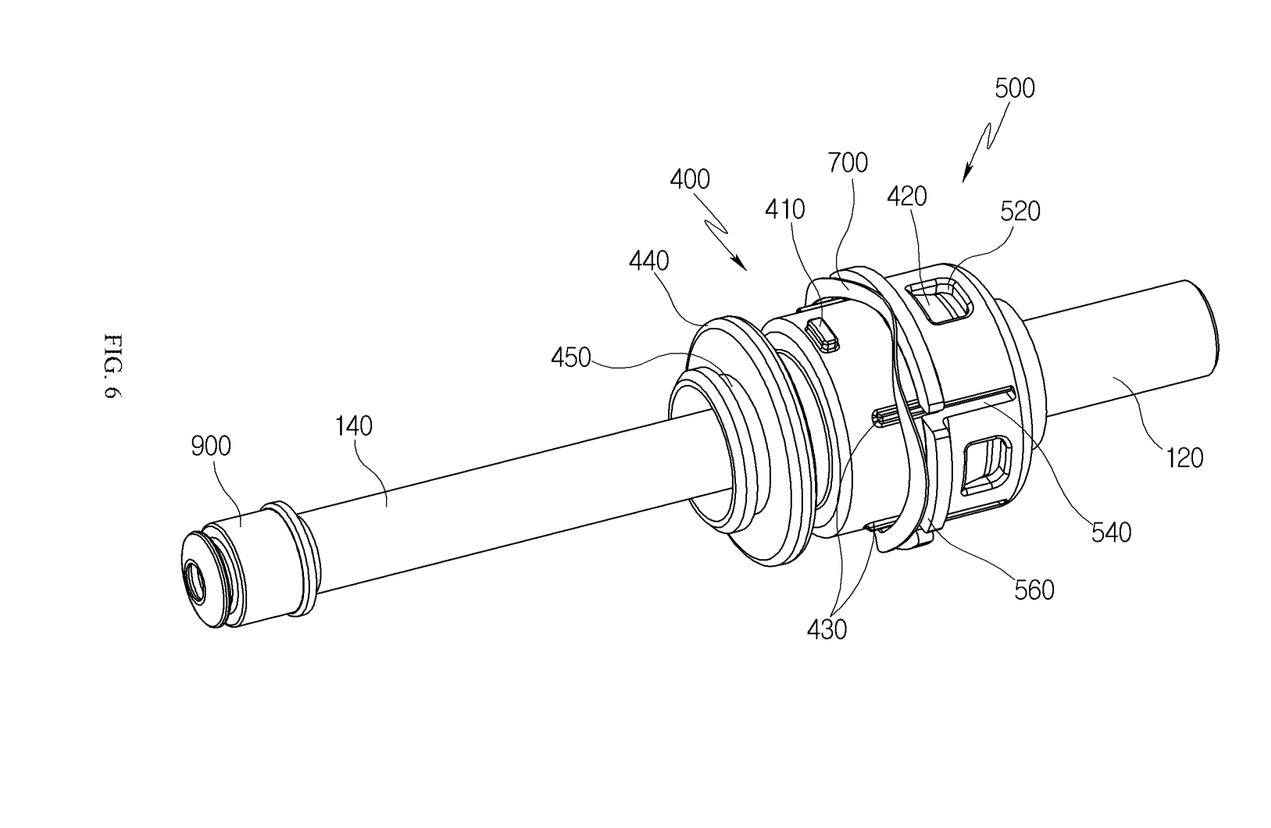
FIG. 6 is a perspective view illustrating a state of removing a portion from the configuration of the structure for fixing a shift cable shown in FIG. 1.
Figure 7:
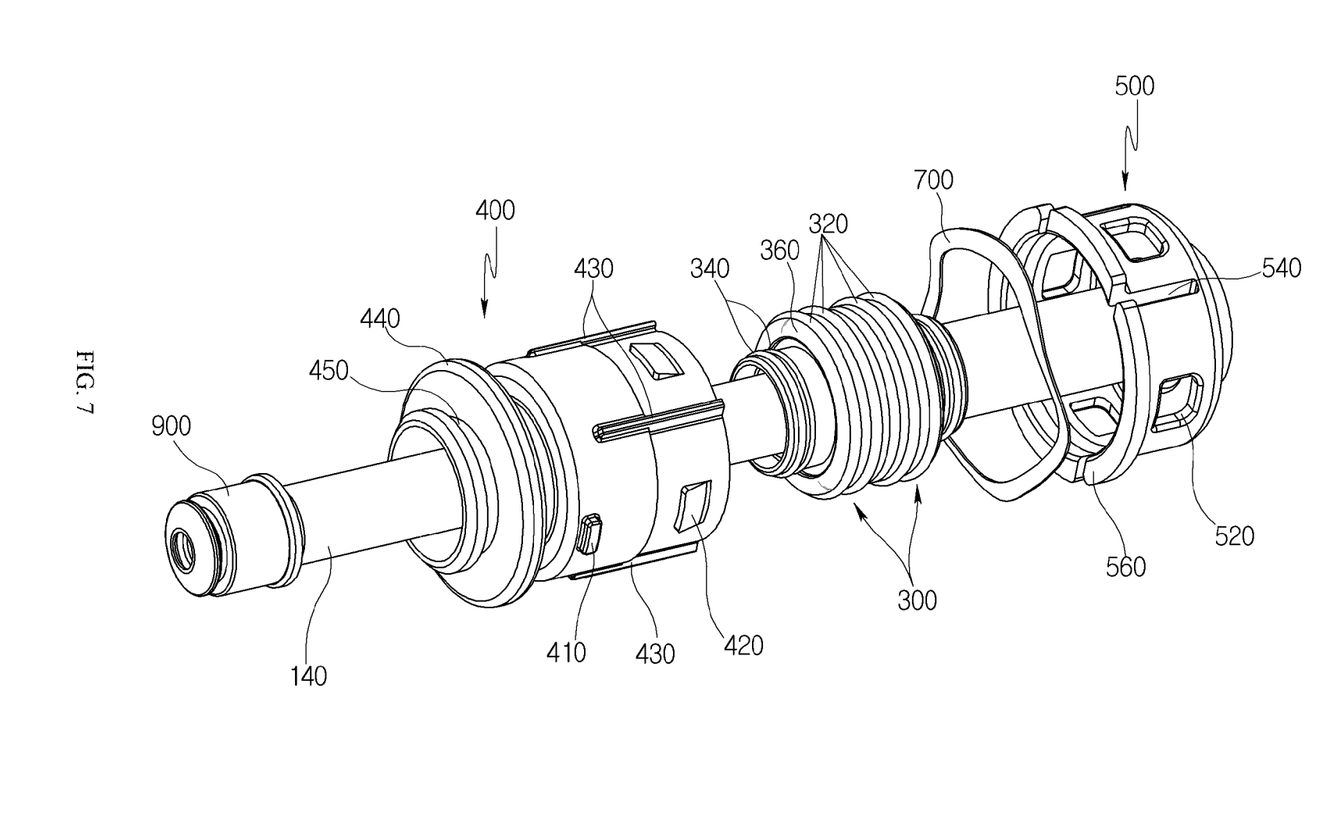
FIG. 7 is an exploded perspective view illustrating the components shown in FIG. 6.
Figure 8:
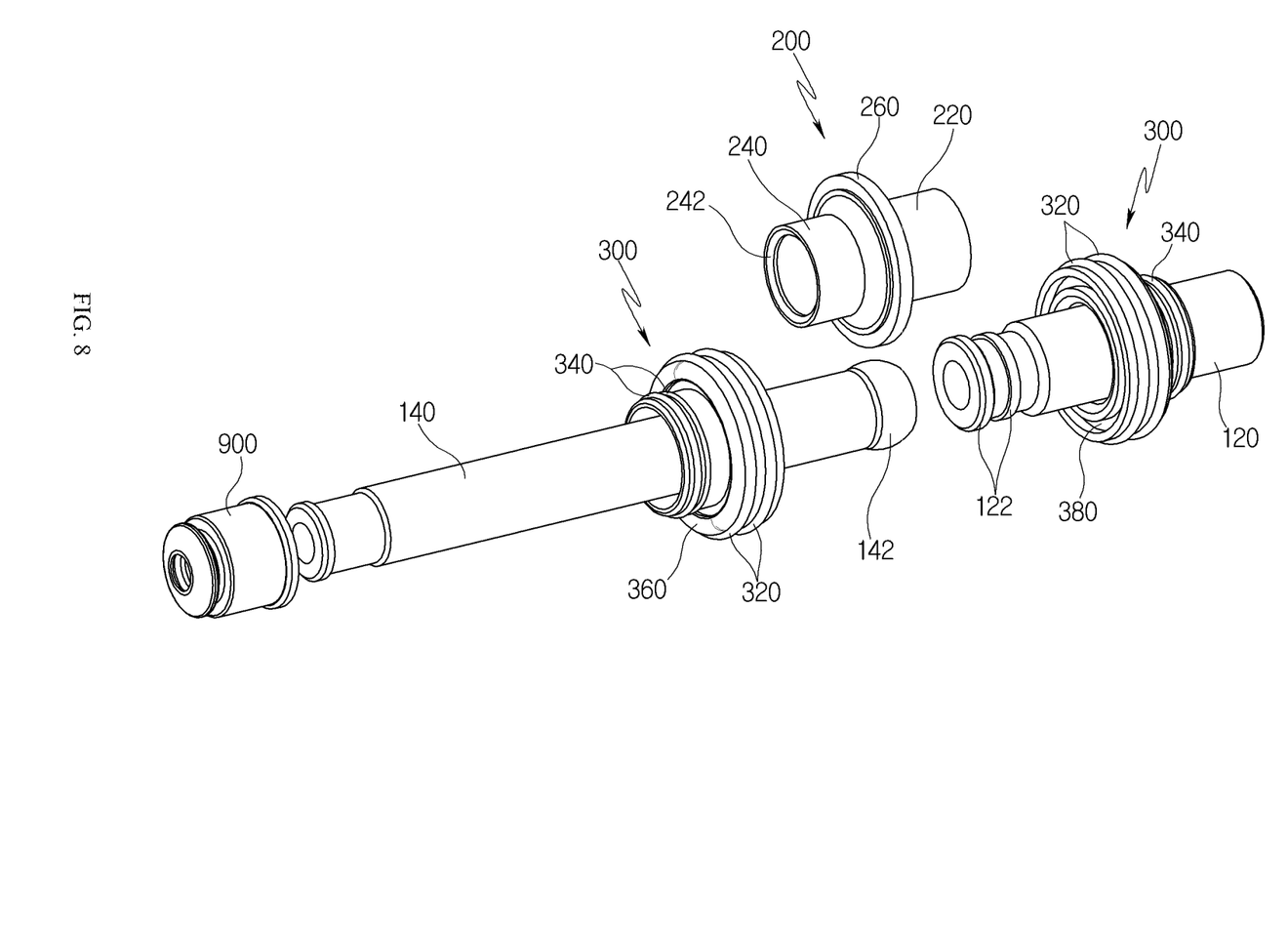
FIG. 8 is an exploded perspective view illustrating an inner principal component which further removes a portion from the components shown in FIG. 7.

Referring to FIGS. 2, 4, and 5, the boot seal 800 is installed between the moving tube 140 and the main casing 400 and serves to block foreign matters from being introduced from the outside through a gap therebetween. In this case, one end portion of the boot seal 800 is fixedly fitted to the catching projection 450 formed at one side of the main casing 400, and the other end portion thereof is closely fixed to the outer peripheral surface of the moving tube 140 by means of a separate fixing means (not shown). Unlike this, the boot seal 800 may also be securely attached to the outer peripheral surface of the moving tube 140 using elastic material properties thereof.

Referring to FIGS. 2, 4, and 6 to 8, an end seal 900 is coupled to the free end of the moving tube 140 and serves to block foreign matters from being introduced from the outside through a gap between the moving tube 140 and the shift cable 10. In this case, the end seal 900 may be closely installed using a stepped structure similarly to the boot seal 800, or may be securely attached using elastic material properties thereof.

Accordingly, when the fixing structure is installed to the mounting bracket 20 of the vehicle body, a clearance is secured between the mounting flange 440 of the main casing 400 and the pressing end 640 of the cover 600 in a state in which the cover 600 is present at a position retreated toward the sub-casing 500 against the main casing 400 by applying external force to the cover 600. In this process, the cover 600 contracts the wave spring 700 and the wave spring 700 is contracted through support of the wave spring 700 by the support end 560 of the sub-casing 500.

Next, after the clearance between the mounting flange 440 and the pressing end 640 is inserted into the mounting groove 22 formed in the mounting bracket 20 by moving the fixing structure, the external force applied to the cover 600 is removed. In this process, when the external force applied to the cover 600 is removed, the cover 600 is moved forward to an original position by restoring force of the wave spring 700 and the forward movement of the cover 600 allows the fixing structure to be securely installed to the mounting bracket 20.

That is, the fixing structure is fixed to the mounting bracket 20 in such a way that the rear surface of the mounting groove 22 of the mounting bracket 20 is supported by contact with the mounting flange 440 of the main casing 400 and at the same time the front surface of the mounting groove 22 of the mounting bracket 20 is supported by contact with the pressing end 640 of the cover 600.

The assembly of the fixing structure is performed by the following processes. After the fixed tube 120 and the moving tube 140 are individually assembled inside the first and second tubular members 220 and 240 of the connection tube 200, the damper 300 is fitted and installed outside each of the first and second tubular members 220 and 240. In this process, the insertion groove 380 of the damper 300 is coupled with the fitting projection 262 formed on the division flange 260 of the connection tube 200, thereby allowing the damper 300 to be securely installed to the connection tube 200.

Next, after the main casing 400 is axially fitted outside the damper 300, the sub-casing 500 is axially moved and assembled to the main casing 400. In this process, the guide slot 540 of the sub-casing 500 is coupled with the guide protrusion 430 of the main casing 400, thereby enabling the assembly direction between the main casing and the sub-casing to be easily set in place. In particular, the fixing protrusion 420 of the main casing 400 is fitted into the insertion hole 520 of the sub-casing 500 such that the sub-casing 500 may be securely assembled to the main casing 400.

In addition, since the circumferential protrusion 320 formed on the large diameter portion and the circumferential protrusion 340 formed on the small diameter portion come into contact with the inner peripheral surface of the main casing 400, the damper 300 may efficiently absorb radial vibration. Furthermore, since the axial protrusion 360 which protrudes from the free end of the large diameter portion toward the inner peripheral surface of the main casing 400 or the inner peripheral surface of the sub-casing 500 comes into contact with the inner peripheral surface thereof, the damper 300 may efficiently absorb axial vibration. In particular, since each protrusion 320, 340, or 360 of the damper 300 may contribute to secure a clearance for increasing an amount of deformation between the main casing 400 and the sub-casing 500 from the outside of the connection tube 200, it may be possible to improve attenuation of vibration and noise.

Next, the cover 600 is axially assembled outside the main casing 400 in a state of supporting the wave spring 700 by the support end of the sub-casing 500. In this process, the support projection 410 of the main casing 400 comes into contact with the guide groove 620 formed on the inner peripheral surface of one end side of the cover 600 so as to restrict separation of the cover 600 from the main casing 400. In this state, the pressing end 640 of the cover 600 and the mounting flange 440 come into contact with both surfaces of the mounting bracket 20, thereby allowing the fixing structure to be securely installed to the mounting groove 22 of the mounting bracket 20. In addition, the receiving space 660 formed on the inner peripheral surface of the other end side of the cover 600 and the support end 560 of the sub-casing 500 may closely support the wave spring 700 and simultaneously store the wave spring 700.

Figure 9:
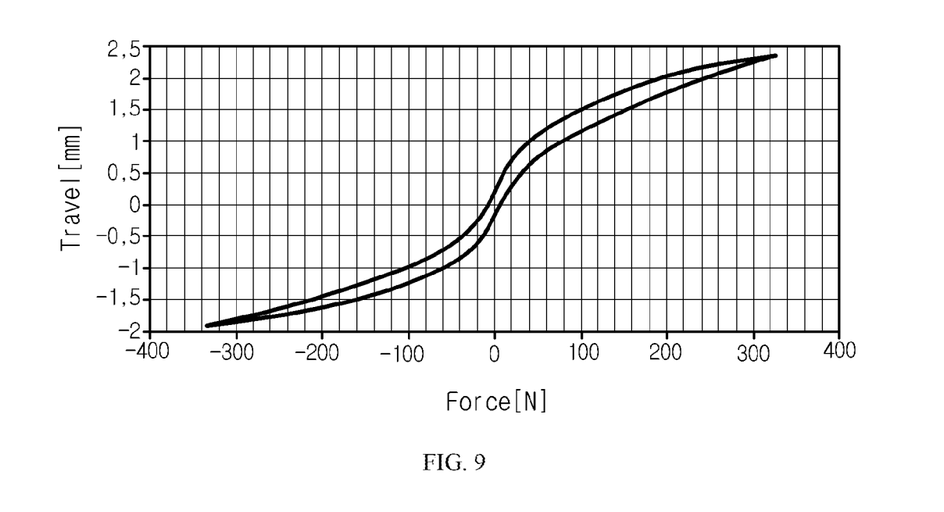
FIG. 9 is a graph illustrating a result of testing characteristics of load versus displacement with respect to the structure for fixing a shift cable according to the embodiment of the present invention.

Meanwhile, according to a result of testing characteristics of load versus displacement with respect to the fixing structure for installation of the shift cable 10, since the present invention may provide the fixing structure matching with hysteresis characteristics of specific specifications as shown in FIG. 9 by means of the circumferential protrusions 320 and 340 and the axial protrusion 360 formed on the damper 300, it may be possible to positively correspond to various required performances.

Although the present invention has been described with respect to the illustrative embodiments, it will be apparent to those skilled in the art that various variations and modifications may be made without departing from the spirit and scope of the invention as defined in the following claims.

INDUSTRIAL APPLICABILITY

A structure for fixing a shift cable according to the present invention may set a support method of a structure for fixedly installing a shift cable within an engine room as an attachable and detachable structure by one-touch operation so as to more easily realize an installation process of the shift cable in a small space.

In addition, since the present invention may secure a clearance for increasing an amount of deformation of a damper in an inner space of the fixing structure by means of using a circumferential protrusion and an axial protrusion formed on the damper, it may be possible to ensure more improved attenuation performance and thereby maximize reductions of vibration and noise. That is, the present invention may minimize a contact part with a casing by changing a shape of the damper and minimize vibration and noise transferred from a transmission to a vehicle body by means of securing the clearance for increasing an amount of deformation of the damper within the casing.

The invention claimed is:

1. A structure for fixing a shift cable, which is used to install the shift cable of a manual transmission, comprising:
    a protective tube for receiving the shift cable therein;
    a connection tube installed outside the protective tube;
    a damper installed outside the connection tube to attenuate radial and axial vibration;
    a main casing which is installed outside the damper and forms a clearance for assembly with a mounting bracket;
    a sub-casing which is detachably coupled to the main casing by an axial assembly guide portion; and
    a cover which is supported by an elastic member with respect to the sub-casing and is installed such that an axial displacement of the cover is restricted with respect to the main casing,
    wherein the protective tube comprises a fixed tube and a moving tube which are installed outside the shift cable while being coaxially arranged with the shift cable,
    wherein the fixed tube is formed, at an outer peripheral surface thereof, with a catching protrusion for coupling with an inner peripheral surface of the connection tube, and the moving tube is formed, at an outer peripheral surface thereof, with a spherical connection portion capable of rotating relative to the inner peripheral surface of the connection tube,
    wherein the connection tube comprises:
        a first tubular member which is formed, at an inner peripheral surface thereof, with a catching groove for coupling with the catching protrusion of the fixed tube;
        a second tubular member which is formed, at an inner peripheral surface thereof, with a spherical seating portion for coupling with the spherical connection portion of the moving tube; and
        a division flange which protrudes outward between the first and second tubular members.

2. The structure according to claim 1, wherein the damper comprises:
    circumferential protrusions which protrude toward an inner peripheral surface of the main casing;
    an axial protrusion which protrudes toward the inner peripheral surface of the main casing or an inner peripheral surface of the sub-casing; and
    an insertion groove which is axially formed for coupling with the connection tube.

3. The structure according to claim 2, wherein the circumferential protrusions are formed on a first diameter portion and a second diameter portion of the damper, respectively, and a diameter of the first diameter portion is larger than a diameter of the second diameter portion.

4. The structure according to claim 1, wherein the main casing comprises:
    a support projection which protrudes outward for restricting the axial displacement of the cover;
    a fixing protrusion having an inclined cross-sectional structure for coupling with the sub-casing;
    a guide protrusion which axially protrudes to guide coupling with the sub-casing;
    a mounting flange which protrudes outward for coupling with the mounting bracket; and
    a catching projection which is formed in a stepped shape outside the mounting flange.

5. The structure according to claim 4, wherein the sub-casing comprises:
    an insertion hole which is formed to insert the fixing protrusion of the main casing thereinto;
    a guide slot which is axially formed to insert the guide protrusion of the main casing thereinto; and
    a support end which is formed so as to protrude outward from an inlet of the guide slot and come into contact with the elastic member.

6. The structure according to claim 5, wherein the cover comprises:
    a guide groove which is formed on an inner peripheral surface to receive the support projection of the main casing and restrict the axial displacement of the cover;
    a pressing end which comes into contact with the mounting bracket by means of a pressing force by the elastic member; and
    a receiving space which is formed on the inner peripheral surface of the cover to install the elastic member.

7. The structure according to claim 1, further comprising a boot seal which is installed between the moving tube and the main casing so as to block introduction of foreign matters thereinto and an end seal which is installed to a free end of the moving tube so as to block introduction of foreign matters thereinto.

* * * * *